United States Patent
Kelly et al.

(10) Patent No.: US 8,477,327 B2
(45) Date of Patent: Jul. 2, 2013

(54) SCANNER REGISTRATION SYSTEMS AND METHODS FOR PROVIDING A NOTIFICATION OF A SCANNER RE-REGISTRATION REQUIREMENT WHEN STATISTICS ARE OUTSIDE PREDETERMINED REGISTRATION RANGE

(75) Inventors: Nancy Kelly, Rochester, NY (US); Biruk Gossaye, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2558 days.

(21) Appl. No.: 11/265,456

(22) Filed: Nov. 2, 2005

(65) Prior Publication Data
US 2007/0097456 A1    May 3, 2007

(51) Int. Cl.
*H04N 1/01*    (2006.01)

(52) U.S. Cl.
USPC .......................... 358/1.14; 358/474

(58) Field of Classification Search
USPC .................................. 358/1.14, 474
See application file for complete search history.

(56) References Cited

U.S. PATENT DOCUMENTS

| | | | |
|---|---|---|---|
| 4,511,242 A | 4/1985 | Ashbee et al. | |
| 5,339,139 A | 8/1994 | Fullerton et al. | |
| 5,748,293 A | 5/1998 | Crawford et al. | |
| 6,032,004 A | 2/2000 | Mirabella, Jr. et al. | |
| 6,593,995 B1 | 7/2003 | Hogestyn | |
| 2004/0109699 A1 | 6/2004 | Skrainar et al. | |
| 2005/0157327 A1* | 7/2005 | Shoji et al. | 358/1.14 |

* cited by examiner

*Primary Examiner* — Qian Yang
(74) *Attorney, Agent, or Firm* — Gibb & Riley, LLC

(57) ABSTRACT

Embodiments herein process a plurality of jobs through a document handler (the jobs comprise one or more media sheets), scan the media sheets as the media sheets pass through the document handler and pass by a scanner, and maintain statistics of registration of the media sheets with respect to the scanner over time (hours or days). The method compares the statistics with a predetermined registration range and provides a notification of a scanner re-registration requirement when the statistics are outside the predetermined range.

20 Claims, 5 Drawing Sheets

SCANNER REGISTRATION SYSTEMS AND METHODS FOR PROVIDING A NOTIFICATION OF A SCANNER RE-REGISTRATION REQUIREMENT WHEN STATISTICS ARE OUTSIDE PREDETERMINED REGISTRATION RANGE

BACKGROUND

Embodiments herein generally relate to scanner registration (alignment) systems and methods and more particularly to systems and methods the provide notification of a need to re-register the scanner and document handler.

In a scanning system, such as a constant velocity transport (CVT) system with electronic registration, the mechanical registration is not tightly controlled but is adjusted in real time by the electronics using edge data detected from the page. For example, U.S. Pat. No. 4,511,242 (which is fully incorporated herein by reference) teaches the use of a reference pattern on a master image receiving sheet with a reference pattern on an original master in order to easily generate correction factors representative of the spatial difference and utilizing those correction factors to electronically control the relative position of receiving sheets and the image so that the sheets are fed to the processing station in synchronism with the latent image on the photoreceptor. In that manner, precision adjustment of mechanical parts is eliminated. Additionally, a feedback apparatus can be added so that wear within the system can be automatically compensated and any other factors causing dynamic misalignment can be compensated.

In order to set limits on the expected location of the page, the machine is run through a series of setup routines to determine the nominal fast scan and slow scan registration locations as well as a slow scan speed correction. Based on mechanical and paper tolerances a window of expected locations can be set. If the actual location of the paper drifts outside of the expected window, misregistration and image loss will occur.

For example, U.S. Pat. No. 5,748,293 (which is fully incorporated herein by reference) discloses belts that are shown at a small distance "t" spaced above the platen glass. This distance "t" represents a tolerance stack-up distance between the platen glass and the belts for when a sheet is present therebetween. A variation in this tolerance stack-up distance "t" between the platen glass and the document handler can cause document misfeeding or a skewed or mis-registered position of the document relative to the platen glass, which can result in skewed or mis-registered copies. This tolerance stack-up distance "t" is dependent on a number of factors or parameters, including, for example, the extent of wear on the belts and the weight and/or backing plate or rollers spring pressure and/or weight with which the belts are biased downwardly on a document overlying the platen glass.

Over time, parts wear and other factors can cause the nominal registration and magnification error of the manual document glass (platen) and the document handler of a scanning system to change. A service call for misregistration can be initiated when the customer starts seeing misregistration and image loss on scanned jobs. However, with the embodiments disclosed herein, a maintenance call could be made before the customer notices a problem, or a trained user could be instructed to run the setup themselves.

SUMMARY

A method embodiment herein comprises processing a plurality of jobs through a document handler (the jobs comprise one or more media sheets), scanning the media sheets as the media sheets pass through the document handler and pass by a scanner, and maintaining statistics of registration of the media sheets with respect to the scanner over time (hours or days). The method compares the statistics with a predetermined registration range and provides a notification of a scanner re-registration requirement when the statistics are outside the predetermined range.

When maintaining the statistics, the method can calculate a distribution curve of a position of a leading edge of the media sheets with respect to the scanner when each of the media sheets is being scanned. Then, when comparing the statistics, the method can compare a position of the distribution curve against the predetermined registration range. In addition, the method removes anomalies from the statistics, to avoid erroneous results, and can maintain the statistics for a plurality of scanning speeds.

An apparatus embodiment comprises a scanner adjacent a document handler. The scanner is adapted to scan media sheets as the media sheets pass through the document handler and pass by the scanner. A processor is operatively connected to the scanner and maintains statistics of registration of the media sheets with respect to the scanner over a plurality of days. A comparator is operatively connected to the processor and can compare the statistics with a predetermined registration range. In addition, an interface is operatively connected to the comparator and provides a notification of a scanner re-registration requirement when the statistics are outside the predetermined registration range.

The processor can calculate a distribution curve of a position of a leading edge of the media sheets with respect to the scanner when each of the media sheets is being scanned and the comparator compares a position of the distribution curve against the predetermined registration range. The processor removes the anomalies from the statistics and maintains the statistics for a plurality of scanning speeds.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, over time, parts wear and other factors can cause the nominal registration and magnification error of the platen and the document handler of a scanning system to change. Registration information which is obtained for every page of a scanned job can be used to monitor the variation from the nominal and provide a notification when this variation exceeds a specified threshold. When the frequency of the registration being outside of a normal range reaches a certain level, embodiments herein flag the need for a service call or customer setup of the scanner registration.

Figure 1:
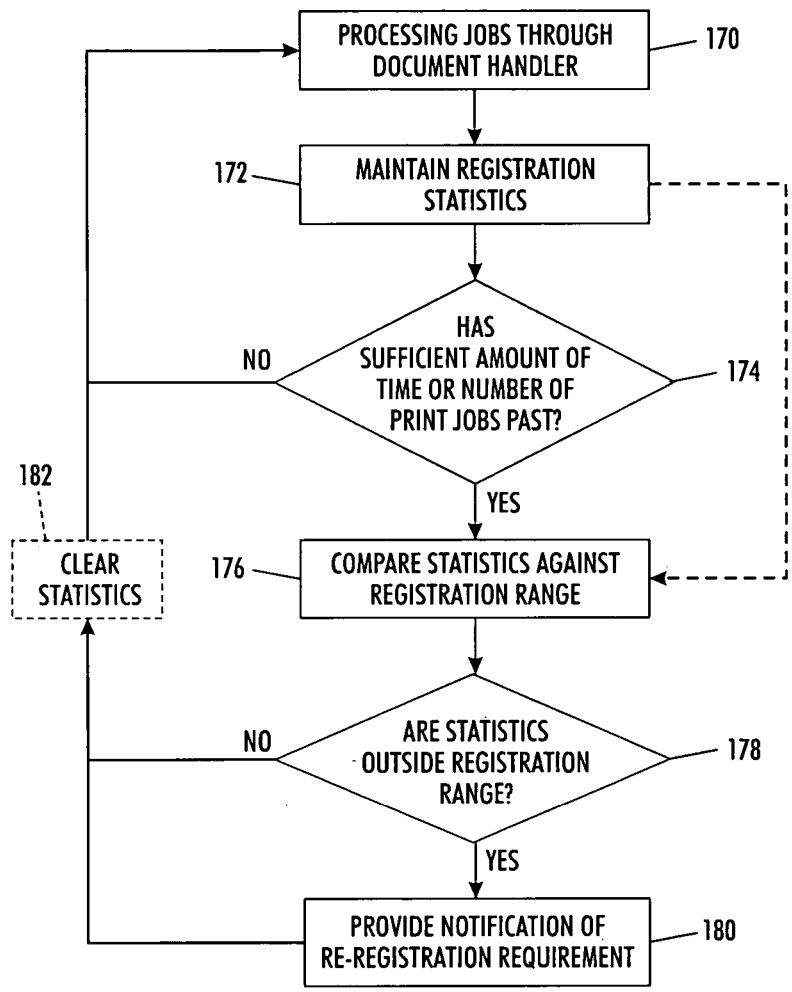
FIG. 1 is a flow diagram illustrating processing utilized by embodiments herein.

More specifically, as shown in FIG. 1, a method embodiment herein comprises processing a plurality of jobs through a document handler (the jobs comprise one or more media sheets) and scanning the media sheets as the media sheets pass through the document handler and pass by a scanner, as shown in item 170. In item 172, the method maintains statistics of registration of the media sheets with respect to the scanner over time (hours or days) or over a specified number of print jobs. If not enough time and/or enough print jobs have been processed, processing returns to item 170 to collect more statistics by operation of item 174.

If enough time and/or enough print jobs have been processed, as determined by item 174, the method compares the statistics with a predetermined registration range in item 176. Note that item 174 is optional and, in some embodiments, processing goes directly from item 172 to item 176 as shown by the dashed line bypassing item 174. Then, the method checks whether the statistics are outside the registration range in item 178. If they are not, processing returns to item 170. If they are, the method provides a notification of a scanner re-registration requirement in item 180 and processing can return to item 170. In item 182, the statistics can optionally be completely or partially cleared so that the statistics that are checked in item 176 are only fresh, recent data relating to jobs that were processed in the most recent period (job or time) or most recent periods. Item 182 is optional and can be omitted if desired.

Figure 2:
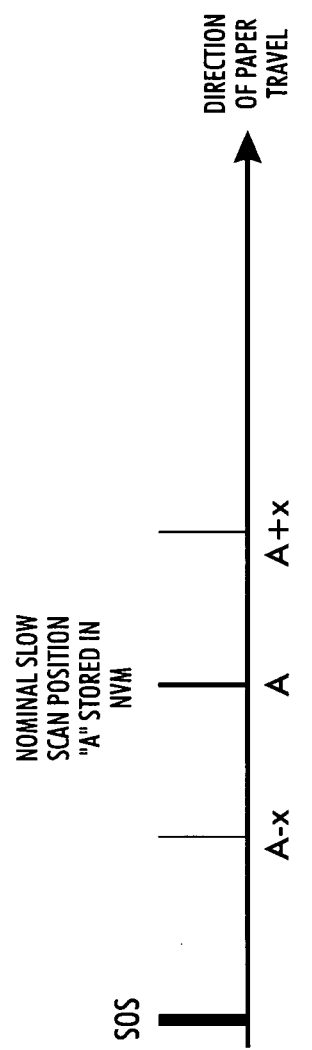
FIG. 2 is a schematic representation of the acceptable registration range for a properly operating scanning system.

When maintaining the statistics in item 172, the method can calculate a distribution curve of a position of a leading edge of the media sheets with respect to the scanner when each of the media sheets is being scanned. For example, FIG. 2 illustrates that the range in which the lead edge of the scanned sheets is expected to be normally distributed around "A", with all or most falling between "A−x" and "A+x." The arrow in FIG. 2 represents the direction of page travel and the line SOS represents the start of scan region. In this example, "x" is the expected variation, determined by mechanical tolerances.

Figure 3:
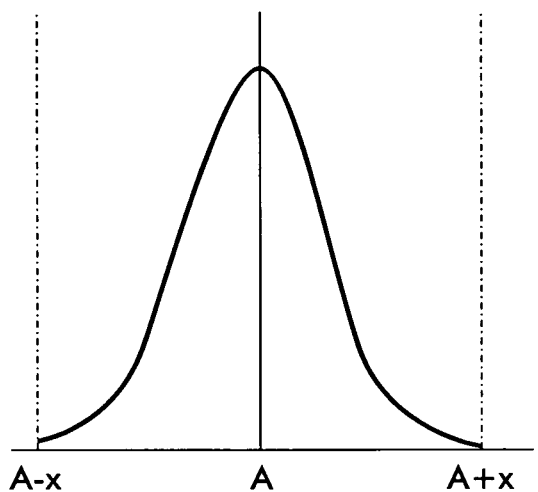
FIG. 3 is a graphical representation of the distribution of occurrences of the leading edge of a sheet of media as of the media is scanned overlaid on the acceptable range of media positions.
Figure 4:
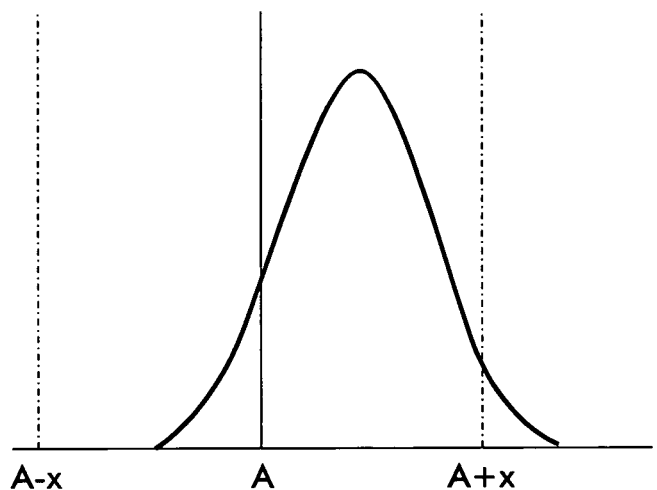
FIG. 4 is a graphical representation of the distribution of occurrences of the leading edge of a sheet of media as of the media is scanned overlaid on the acceptable range of media positions.

FIG. 3 illustrates the normal distribution curve expected for a properly set-up machine. As can be seen in FIG. 3, the greatest number of samples of the leading edge position are at position A. FIG. 4 shows an example curve for a machine which has shifted away from nominal. In this case, most of the leading edges of the sheets are being seen on the "+" side of the tolerance. Those that fall above the "A+x" point, will be registration failures. When comparing the statistics in item 176, the method can compare a position of the distribution curve against the predetermined registration range. In addition, the method removes anomalies from the statistics, to avoid erroneous results, and can maintain the statistics for a plurality of scanning speeds.

Thus, embodiments herein monitor the location and size of each page scanned and keep track of the differences from the nominal without compromising the productivity of the machine. The difference from nominal for fast scan center location, slow scan start location and paper slow scan size are calculated and saved for every page of a job. At the end of the job, the mean difference from the nominal are calculated for fast scan center (in document handler) and slow scan start (on the platen). The mean difference from the reported paper size can be calculated also. Very large differences in individual pages are ignored as they are assumed to be due to mixed size originals or other anomalies. If consistent and excessive drift from the nominal is seen in any of these values, over several jobs, or several days, (these limits are programmable), the machine informs the user or service center that the scanner requires a recalibration of its registration values. This minimizes a false indication of the need to run a setup procedure.

Embodiments herein do more than examine a single or a few setup pages because embodiments herein maintain running statistics (e.g., average, mean, distribution, etc.) over a number of print jobs, over a number of hours, over a number of days, etc. Then, after the data is collected and the statistics are calculated, the results are compared to the registration range to see if an adjustment is required. Then, a new period of data collection begins for the next number of print jobs, over a number of hours, over a number of days, etc. after which the statistical calculations and comparison are repeated. The process continually repeats and continually acquires new data so that when the distribution is compared to the registration range, only fresh data relating only to the most recent preceding period is used in the comparison. Alternatively, a certain number of previous periods can be utilized to perform the statistical computations so that some unusual amount of difficult print jobs do not unnecessarily cause a false need for the registration setup procedure to be run.

Figure 5:
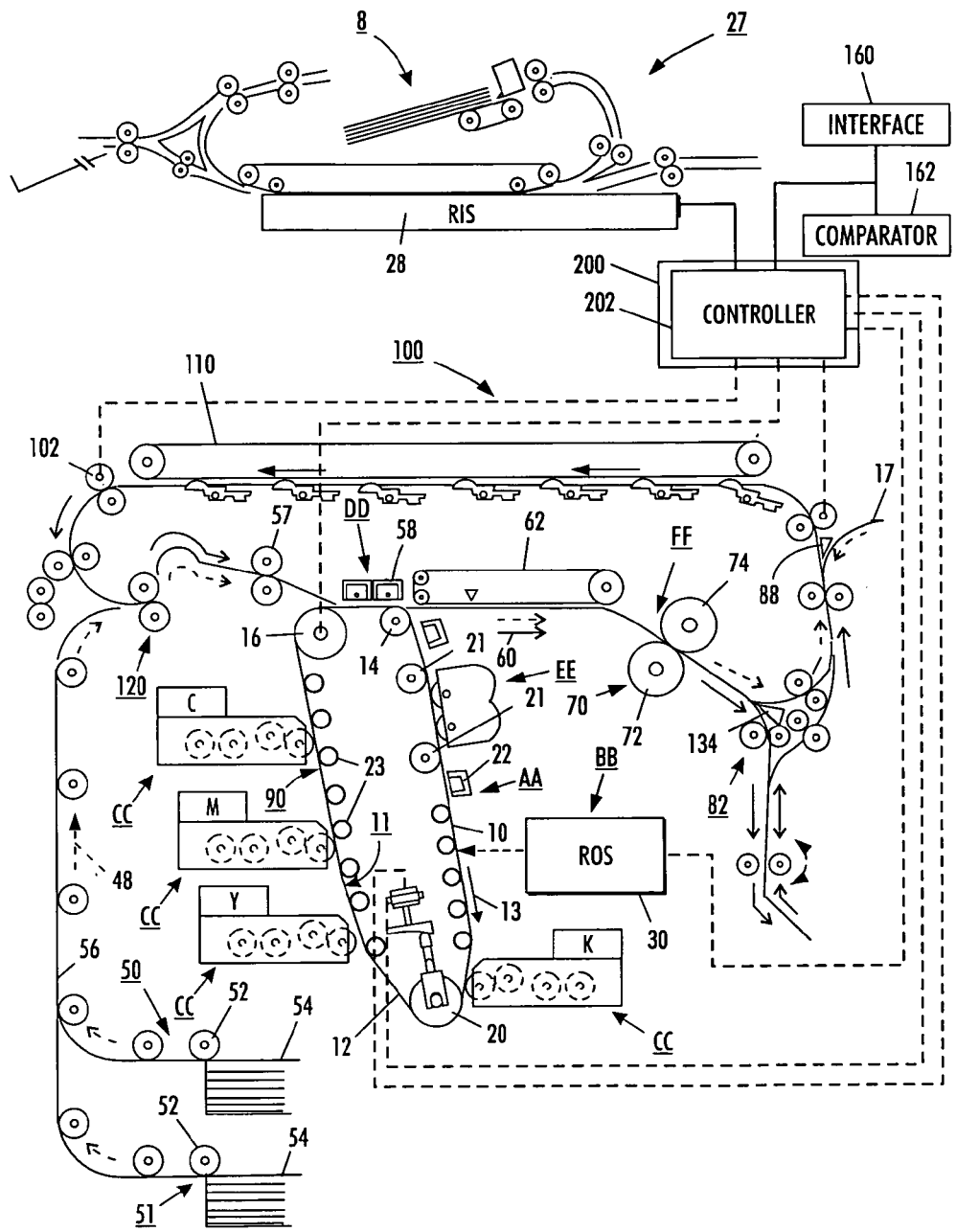
FIG. 5 is a schematic diagram of a scanning apparatus used in conjunction with a printing apparatus.

FIG. 5, schematically illustrates an apparatus embodiment in a toner image producing machine such as a copier, printer, or multifunction device shown in the form of an electrostatographic reproduction machine 8 which is sometimes referred to herein as an image outputting terminal (IOT). Some elements shown in FIG. 5 are described in detail in U.S. Patent Application 2004/0109699, the complete disclosure of which is incorporated herein by reference. In the machine 8, an original document is positioned in a document handling module 27 on a raster input scanner (RIS) module indicated generally by reference numeral 28. The RIS module 28, for example, contains document illumination lamps, optics, a mechanical scanning drive, and a charge coupled device (CCD) array, full width array (FWA), etc. The RIS module 28 operates to capture the entire original document and converts it to a series of raster scan lines. This information is transmitted to a control module 200 that includes an electronic subsystem (ESS) processor 202 that controls a raster output scanner (ROS) 30.

The machine 8 generally employs a photoreceptor module 90 including a photoconductive member shown as a belt 10. The photoconductive belt 10 can be made from a photoconductive material coated on a ground layer which, in turn, is coated on an anti-curl backing layer. The belt 10 moves in the direction of arrow 13 to advance successive portions sequentially through the various processing stations disposed about the path of movement thereof. The belt 10 is entrained as a closed loop 11 about a stripping roll 14, a drive roll 16, and an idler roll 21.

Initially, a portion of the photoconductive belt surface passes through a charging station AA. At the charging station AA, a corona generating device indicated generally by the reference numeral 622 charges the photoconductive belt 10 to a relatively high, substantially uniform potential. At an exposure station BB, the controller or electronic subsystem (ESS) processor 202, receives image signals from the RIS 28 representing the desired output image and processes these signals to convert them to a continuous tone or gray scale rendition of the image which is transmitted to a modulated output generator, for example the raster output scanner (ROS), indicated generally by reference numeral 30.

The ROS 30 includes a laser with rotating polygon mirror blocks. For example, a nine-facet polygon could be used. The ROS 30 illuminates the charged portion on the surface of the photoconductive belt 10 at a resolution of about 300 or more pixels per inch. The ROS will expose the photoconductive belt 10 to record an electrostatic latent image thereon corresponding to the continuous tone image received from the ESS processor 202. As an alternative, the ROS 30 may employ a linear array of light emitting diodes (LEDs) arranged to illuminate the charged portion of the photoconductive belt 10 on a raster-by-raster basis.

After the electrostatic latent image has been recorded on the photoconductive surface 12, the belt 10 advances the latent image to a development station CC, which includes four development modules as shown each having developer units containing CMYK color toners, in the form of liquid or dry particles. As is well known, the CMYK color toners are electrostatically attracted to the latent images using commonly known techniques.

After the electrostatic latent image is developed, the toner powder image present on the belt 10 advances to the transfer station DD. A print sheet 48 is advanced to the transfer station DD, by a sheet feeding module or apparatus 50, 51. The sheet feeding apparatus 50, 51 includes a feed roll 52 contacting the uppermost sheet of the stack 54. The feed roll 52 rotates to advance the uppermost sheet from the stack 54 to the sheet transport 56. The sheet transport 56 directs the advancing sheet 48 of support material into the registration assembly 57 and then into the image transfer station DD to receive a toner image from the photoreceptor belt 10 in a timed sequence. The toner image on the image bearing surface 12 of the belt 10 contacts the advancing sheet 48 at transfer station DD. The transfer station DD includes a corona-generating device 58, which sprays ions onto the backside of sheet 48. This attracts the toner image from the photoconductive surface 12 to the sheet 48. After image transfer as such, the sheet 48 continues to move in the direction of arrow 60 by way of the belt transport 62, which advances the sheet 48 to the fusing station FF.

The fusing station FF includes a fusing module indicated generally by the reference numeral 70 which permanently affixes the transferred toner power image to the copy sheet. Preferably, the fusing module 70 includes a heated fuser roller 72 and a pressure roller 74 with the powder image on the copy sheet contacting fuser roller 72. The pressure roller is biased against the fuser roller to provide the necessary pressure to fix the toner powder image to, the copy sheet. The fuser roll is internally heated by a quartz lamp (not shown). A release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through the fusing module 70 where the image is permanently fixed or fused to the sheet. After passing through the fusing module 70, a gate 88 either allows the sheet to move directly via an output 17 to a finisher or stacker, or deflects the sheet into the duplex path 100, specifically, first into a single sheet inverter 82. That is, if the second sheet is either a simplex sheet, or a completed duplexed sheet having both side one and side two images formed thereon, the sheet will be conveyed via gate 88 directly to the output finishing modules (260, 262 FIG. 2) via output path 17.

However, if the sheet is being duplexed and is then only printed with a side one image, the gate 88 will be positioned to deflect that sheet into the inverter 82 and into the duplex loop path 100, where that sheet will be inverted and then fed to the acceleration nip 102 and belt transports 110, for recirculation back through the transfer station DD and the fusing module 70 for receiving and permanently fixing the side two image to the backside of that duplex sheet, before it exits via the exit path 17.

After the print sheet is separated from the photoconductive surface 12 of the belt 10, the residual toner/developer and paper fiber particles adhering to photoconductive surface 12 are removed therefrom at a cleaning station EE. The cleaning station EE includes a rotatably mounted fibrous brush in contact with the photoconductive surface 12 to disturb and remove paper fibers and a cleaning blade to remove the non-transferred toner particles. The blade may be configured in either a wiper or doctor position depending on the application. Subsequent to cleaning, a discharge lamp (not shown) floods the photoconductive surface 12 with light to dissipate any residual electrostatic charge remaining thereon prior to the charging thereof for the next successive imaging cycle.

Figure 6:
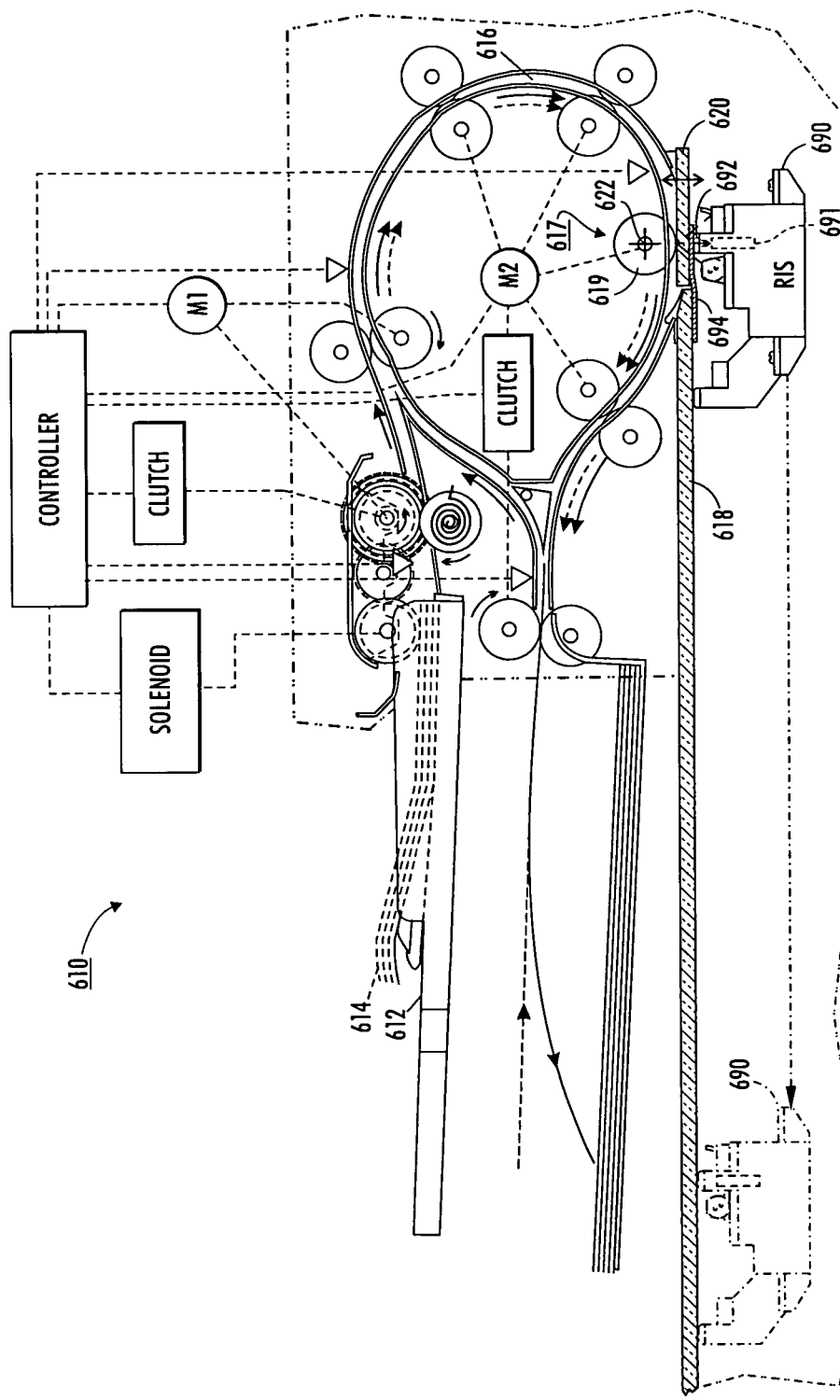
FIG. 6 is a schematic diagram of a document handler and scanner.

One more detailed example of a full width array (FWA) constant velocity transport (CVT) scanner/document handler is shown in FIG. 6, which is similar to an automatic document feeder disclosed in U.S. Pat. Nos. 5,339,139 and 6,593,995, the complete disclosures of which are incorporated herein by reference. More specifically, in FIG. 6 there is shown a dual mode document handler 610. Document sheets 614 to be imaged while moving may, as shown in FIG. 6, be automatically individually fed from a stack of sheets in an input tray 612 by a document feeder into sheet path 616 to the CVT imaging station 617, where a CVT transport roller 619 engages and feeds the sheet 614 at a constant velocity while pressing the imaged area of the sheet 614 against the upper surface of the small (narrow) transparent glass imaging platen 620 for imaging by the RIS imaging optics unit 690. The RIS is part of a known type of imaging unit 690 having slide pads 692 providing a low friction surface. The structure also includes an imager bar 691, which may be a conventionally, commercially available, full document width array of multiple CCD photosites raster input scanner (RIS). Similarly, the structure includes transitioning strips 694 of flexible and relatively low friction material to the bottom side of platens, inboard and outboard, outside of the imaging station area. These slide pads 692 are biased to maintain engagement with the bottom surface of the platen 620, to thus maintain a consistent focal distance from the upper surface of the (floating) platen 620, and hence from the document 614 being imaged.

Although a single roll 619 (or common axis plural rolls) CVT is shown, it will be appreciated that there are other known CVT systems in which there is a pair of CVT rolls spaced on opposite sides of the imaging area 617 and a floating baffle holds the document down against the platen in imaging area.

When scanning a stationary document, the large platen 618 is used. This scanning is performed by the same single optics unit 690 and its slide pads 692 moving under that other platen 618, as shown by the movement arrow and phantom line position thereof. For each return to the first mode of automatic document feeding and scanning, the optics unit 690 must then return back to its imaging station 617 position.

Thus, an apparatus embodiment comprises a scanner 28, 690 adjacent a document handler 10, 27. The scanner 28, 690 is adapted to scan media sheets as the media sheets pass through the document handler and pass by the scanner 28, 690. The processor 202 is operatively connected to the scanner 28, 690 and maintains statistics of registration of the media sheets with respect to the scanner 28, 690 over a plurality of days. A comparator 162 is operatively connected to or incorporated within the processor 202 and can compare the statistics with a predetermined registration range. In addition, an interface 160 (which can comprise a graphic user interface, a network connection, etc.) is operatively connected to the comparator 162 and provides a notification of a scanner re-registration requirement when the statistics are outside the predetermined registration range. Thus, the interface 160 can notify the user to perform a registration setup operation or notify the user to call for service with an on screen display message. Alternatively, the interface 160 can connect to a network that sends a message to a service center to allow a trained technician to perform the registration setup.

The processor 202 can calculate the distribution curve shown in FIGS. 3 and 4 of a position of a leading edge of the media sheets with respect to the scanner 28, 690 when each of the media sheets is being scanned and the comparator 162 compares a position of the distribution curve against the predetermined registration range. The processor 202 removes the anomalies from the statistics and maintains the statistics for a plurality of scanning speeds.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The following claims can encompass embodiments that print in monochrome, color or handle color image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof

What is claimed is:

1. A computer-implemented method comprising:
processing a plurality of jobs through a document handler, wherein said jobs comprise one or more media sheets;
scanning said media sheets as said media sheets pass through said document handler and pass by a scanner;
using a computer, maintaining statistics of registration of said media sheets with respect to said scanner over time;
using said computer, comparing said statistics with a predetermined registration range; and
using a computer, providing a notification of a scanner re-registration requirement when said statistics are outside said predetermined registration range.

2. The method according to claim 1, wherein said maintaining of said statistics comprises calculating a distribution curve of a position of a leading edge of said media sheets with respect to said scanner when each of said media sheets is being scanned.

3. The method according to claim 2, wherein said comparing of said statistics compares a position of said distribution curve against said predetermined registration range.

4. The method according to claim 1, wherein said maintaining of said statistics comprises removing anomalies from said statistics.

5. The method according to claim 1, wherein said maintaining of said statistics is performed for a plurality of scanning speeds.

6. A computer-implemented method comprising:
processing a plurality of jobs through a document handler, wherein said jobs comprise one or more media sheets;
scanning said media sheets as said media sheets pass through said document handler and pass by a scanner;
using a computer, maintaining statistics of registration of said media sheets with respect to said scanner until a predetermined period has passed;
using said computer, after said predetermined period has passed, comparing said statistics with a predetermined registration range; and
using said computer, providing a notification of a scanner re-registration requirement when said statistics are outside said predetermined range.

7. The method according to claim 6, wherein said maintaining of said statistics comprises calculating a distribution curve of a position of a leading edge of said media sheets with respect to said scanner when each of said media sheets is being scanned.

8. The method according to claim 7, wherein said comparing of said statistics compares a position of said distribution curve against said predetermined registration range.

9. The method according to claim 6, wherein said maintaining of said statistics comprises removing anomalies from said statistics.

10. The method according to claim 6, wherein said maintaining of said statistics is performed for a plurality of scanning speeds.

11. An apparatus comprising:
a document handler;
a scanner adjacent said document handler, wherein said scanner is adapted to scan media sheets as said media sheets pass through said document handler and pass by said scanner;
a processor operatively connected to said scanner and being adapted to maintain statistics of registration of said media sheets with respect to said scanner over time;
a comparator operatively connected to said processor and being adapted to compare said statistics with a predetermined registration range; and
an interface operatively connected to said comparator and being adapted to provide a notification of a scanner re-registration requirement when said statistics are outside said predetermined registration range.

12. The apparatus according to claim 11, wherein said processor is further adapted to calculate a distribution curve of a position of a leading edge of said media sheets with respect to said scanner when each of said media sheets is being scanned.

13. The apparatus according to claim 12, wherein said comparator is further adapted to compare a position of said distribution curve against said predetermined registration range.

14. The apparatus according to claim 11, wherein said processor is further adapted to remove anomalies from said statistics.

15. The apparatus according to claim 11, wherein said processor is further adapted to maintain said statistics for a plurality of scanning speeds.

16. An apparatus comprising:
a document handler;
a scanner adjacent said document handler, wherein said scanner is adapted to scan media sheets as said media sheets pass through said document handler and pass by said scanner;
a processor operatively connected to said scanner and being adapted to maintain statistics of registration of said media sheets with respect to said scanner until a predetermined period has passed;

a comparator operatively connected to said processor and being adapted to compare said statistics with a predetermined registration range after said predetermined period has passed; and an interface operatively connected to said comparator and being adapted to provide a notification of a scanner re-registration requirement when said statistics are outside said predetermined registration range.

17. The apparatus according to claim 16, wherein said processor is further adapted to calculate a distribution curve of a position of a leading edge of said media sheets with respect to said scanner when each of said media sheets is being scanned.

18. The apparatus according to claim 17, wherein said comparator is further adapted to compare a position of said distribution curve against said predetermined registration range.

19. The apparatus according to claim 16, wherein said processor is further adapted to remove anomalies from said statistics.

20. The apparatus according to claim 16, wherein said processor is further adapted to maintain said statistics for a plurality of scanning speeds.

* * * * *